US012236367B2

(12) United States Patent
Wu et al.

(10) Patent No.: US 12,236,367 B2
(45) Date of Patent: *Feb. 25, 2025

(54) METHOD AND SYSTEM FOR SMART DETECTION OF BUSINESS HOT SPOTS

(71) Applicant: INTUIT INC., Mountain View, CA (US)

(72) Inventors: Grace Wu, Mountain View, CA (US); Shashank Shashikant Rao, San Jose, CA (US); Susrutha Gongalla, Mountain View, CA (US); Nhung Ho, Redwood City, CA (US); Carly Wood, Mountain View, CA (US); Vaibhav Sharma, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,987

(22) Filed: Jan. 11, 2024

(65) Prior Publication Data

US 2024/0144059 A1    May 2, 2024

Related U.S. Application Data

(63) Continuation of application No. 18/194,679, filed on Apr. 3, 2023, now Pat. No. 11,907,864, which is a continuation of application No. 17/404,356, filed on Aug. 17, 2021, now Pat. No. 11,645,564, which is a continuation of application No. 15/913,812, filed on Mar. 6, 2018, now Pat. No. 11,120,349.

(51) Int. Cl.
*G06N 5/048* (2023.01)
*G06Q 10/04* (2023.01)

(52) U.S. Cl.
CPC ............. *G06N 5/048* (2013.01); *G06Q 10/04* (2013.01)

(58) Field of Classification Search
CPC ............................... G06N 5/048; G06Q 10/04
USPC ............................................................ 706/52
See application file for complete search history.

(56) References Cited

U.S. PATENT DOCUMENTS

| 8,185,544 | B2 * | 5/2012 | Oztekin | G06F 16/353 |
| | | | | 707/726 |
| 8,855,684 | B2 * | 10/2014 | Bellver | H04W 4/02 |
| | | | | 455/457 |
| 10,691,698 | B2 | 6/2020 | Chandrasekaran et al. | |

(Continued)

*Primary Examiner* — William D Titcomb
(74) *Attorney, Agent, or Firm* — Patterson + Sheridan, LLP

(57) ABSTRACT

Aspects of the present disclosure provide techniques for classifying a trip. Embodiments include receiving, from a plurality of users, a plurality of historical trip records. Each of the plurality of historical trip records may comprise one or more historical trip attributes and historical classification information. Embodiments include training a predictive model, using the plurality of historical trip records, to classify trips based on trip records. Training the predictive model may comprise determining a plurality of hot spots based on the historical trip records, each of the plurality of hot spots comprising a region encompassing one or more locations, and associating, in the predictive model, the plurality of hot spots with historical classification information. Embodiments include receiving, from a user, a new trip record comprising a plurality of trip attributes related to a trip and using the predictive model to predict a classification for the trip based on the trip record.

20 Claims, 5 Drawing Sheets

(56) References Cited

U.S. PATENT DOCUMENTS

| | | | |
|---|---|---|---|
| 11,645,564 B2* | 5/2023 | Wu | G06N 5/048 |
| | | | 706/52 |
| 11,907,864 B2* | 2/2024 | Wu | G06Q 10/04 |
| 2015/0339712 A1* | 11/2015 | Koutrika | G06F 16/9535 |
| | | | 705/14.53 |
| 2017/0124490 A1 | 5/2017 | Crabtree et al. | |
| 2017/0289305 A1* | 10/2017 | Liensberger | H04W 4/02 |
| 2018/0012141 A1* | 1/2018 | Chehreghani | G06Q 10/06 |
| 2018/0024901 A1 | 1/2018 | Tankersley et al. | |
| 2018/0314998 A1 | 11/2018 | Liu | |
| 2019/0171755 A1 | 6/2019 | Yanez et al. | |
| 2023/0325693 A1* | 10/2023 | Wu | G06N 5/048 |
| | | | 706/52 |

\* cited by examiner

300A

|  | LATITUDE | LONGITUDE | TIMESTAMP |
|---|---|---|---|
| ORIGIN | 32.782266 | -96.796755 | 03-01-2018 7:00 |
| DESTINATION | 32.872075 | -96.936093 | 03-01-2018 7:20 |
| USER: RuntimeUser1 ||||

|  | LATITUDE | LONGITUDE | TIMESTAMP |
|---|---|---|---|
| ORIGIN | 32.867423 | -96.937771 | 03-01-2018 8:00 |
| DESTINATION | 32.782180 | -96.793491 | 03-01-2018 8:40 |
| USER: HistoricalUser123 ||||
| GROUND TRUTH LABEL: BUSINESS CLASSIFICATION ||||

FIG. 3B

METHOD AND SYSTEM FOR SMART DETECTION OF BUSINESS HOT SPOTS

CROSS-REFERENCE TO RELATED APPLICATIONS

This Application is a continuation of co-pending U.S. patent application Ser. No. 18/194,679, filed Apr. 3, 2023, which is a continuation of co-pending U.S. patent application Ser. No. 17/404,356, filed Aug. 17, 2021, which is a continuation of U.S. patent application Ser. No. 15/913,812, filed Mar. 6, 2018, now U.S. Pat. No. 11,120,349, the contents of each of which are incorporated herein by reference in their entirety.

INTRODUCTION

Aspects of the present disclosure generally relate to smart location grouping. In particular, embodiments of the present disclosure involve attaching context information to regions with dynamic region definitions.

BACKGROUND

Location information is increasingly used by applications in order to provide services to users. Client devices often include location tracking systems, such as satellite-based positioning systems, and these devices are commonly used to determine a location of a user of an application. Location information of users of an application may be used for a variety of purposes, such as to provide personalized or targeted services to users, gather data about users, identify trends, and the like.

One context in which location information may be used is that of financial services applications, such as tax preparation or accounting applications. In such applications, location data may be used to identify characteristics of a user's activity in order to assist the user in categorizing activities for financial management purposes. For example, location information may be used to assist in the classification of activities as either business or personal activities. These classifications may be significant for financial management purposes, such as accounting or tax preparation, as they may be related to whether expenses are billable, tax-deductible, or the like.

While location information is generally useful for classifying user activities, such as trips, it often does not provide enough data for accurate classifications. For example, parking lots may register as separate locations from buildings with which they are associated, and it may not be clear based on location alone whether a user that has parked in a parking lot is traveling to a particular destination (e.g., without being able to resolve the user's detected location to a particular known destination, such as a business establishment, it may be difficult to classify the trip as either business or personal). As another example, a self-employed user, such as a rideshare driver, may travel to irregular and varied locations (e.g., airports and other public establishments) for business purposes, and it may be difficult to determine whether such travel is personal or related to business (e.g., due to the fact that certain establishments may be related to either business or personal travel depending on the circumstances). As such, there is a need for improved techniques of using location information to provide services to users.

BRIEF SUMMARY

Certain embodiments provide a computer-implemented method for classifying a trip. The method generally includes receiving, from a plurality of users, a plurality of historical trip records, wherein each historical trip record of the plurality of historical trip records comprises: one or more historical trip attributes; and historical classification information. The method further includes training a predictive model, using the plurality of historical trip records, to classify trips based on trip records, wherein training the predictive model comprises: determining a plurality of hot spots based on the historical trip records, wherein each of the plurality of hot spots comprises a region that encompasses one or more locations; and associating, in the predictive model, the plurality of hot spots with historical classification information. The method further includes receiving, from a user, a new trip record comprising a plurality of trip attributes related to a trip; and using the predictive model to predict a classification for the trip based on the new trip record.

Other embodiments provide a computer-implemented method for classifying a trip. The method generally includes receiving, from a user, a trip record comprising a plurality of trip attributes related to a trip. The method further includes using a predictive model to predict a classification for the trip based on the trip record, wherein the predictive model has been trained based on a plurality of historical trip records from a plurality of users, and wherein the predictive model associates a plurality of hot spots with historical classification information.

Other embodiments provide a system comprising a processor and a non-transitory computer-readable medium storing instructions that, when executed by the processor, cause the processor to perform an operation for classifying a trip The operation generally includes receiving, from a plurality of users, a plurality of historical trip records, wherein each historical trip record of the plurality of historical trip records comprises: one or more historical trip attributes; and historical classification information. The operation further includes training a predictive model, using the plurality of historical trip records, to classify trips based on trip records, wherein training the predictive model comprises: determining a plurality of hot spots based on the historical trip records, wherein each of the plurality of hot spots comprises a region that encompasses one or more locations; and associating, in the predictive model, the plurality of hot spots with historical classification information. The operation further includes receiving, from a user, a new trip record comprising a plurality of trip attributes related to a trip; and using the predictive model to predict a classification for the trip based on the new trip record.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3A depicts an example trip record and FIG. 3B depicts an example historical trip record.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
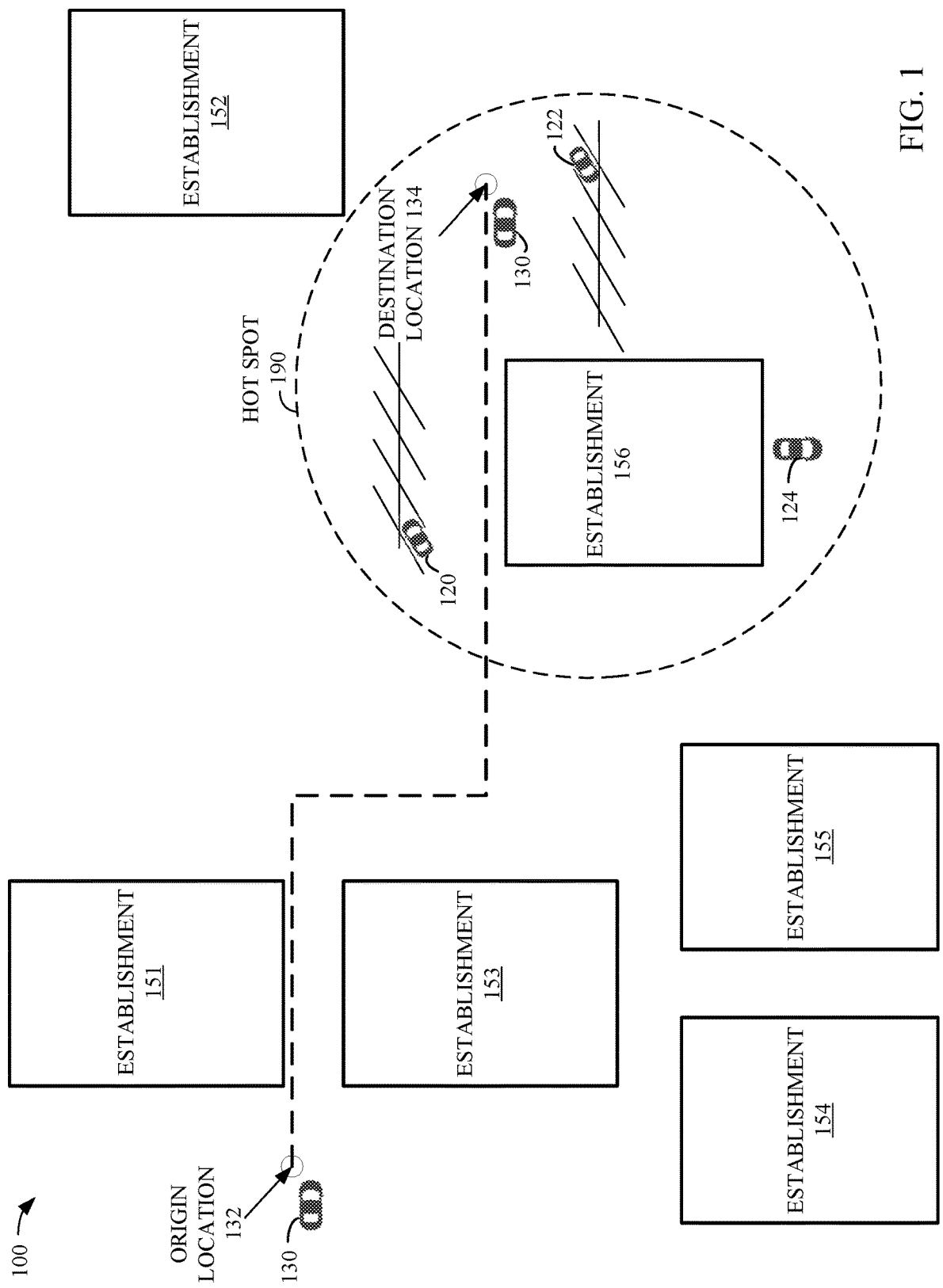
FIG. 1 depicts an example of location data being captured for use in trip classification techniques described herein.

Aspects of the present disclosure provide apparatuses, methods, processing systems, and computer readable mediums for smart location grouping.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

Embodiments of the present disclosure relate to services that are provided to users (e.g., from one or more servers) based on location data captured by client devices operated by the users. For example, a user may enable a feature of an application that makes use of a location tracking system, such a satellite-based positioning system (e.g., global positioning system (GPS), global navigation satellite system (GLONASS), or the like), associated with a client device to track the user's location for the purposes of classifying user activities such as trips (e.g., for accounting or tax preparation purposes). In order to improve location-based services, embodiments of the present disclosure involve training a predictive model based on historical data in order to classify user activities (e.g., having an origin location and a destination location). The predictive model may comprise a data model (e.g., a cluster model, linear model, neural network, or the like) that is trained using a set of input variables (e.g., historical trip records) and an output variable (e.g., historical classification data). Once trained, the predictive model may be used to predict an output (e.g., a predicted classification) based on input variables (e.g., a new trip record). Historical data may include, for example, historical trip records from a particular user or from a plurality of users, the trip records may include origin locations, destination locations, and time stamps. In some embodiments, at least a subset of the historical trip records may comprise user-provided data or "ground truth labels", such as classification data and/or descriptive text that is related to the trip records. For example, users may provide input through client devices that capture location data, the input including descriptions of locations (e.g., "home" or "work"), classifications of trips (e.g., "business" or "personal"), and the like.

In some examples, training the predictive model may involve identifying "hot spots" based on historical trip records. A hot spot generally refers to a region (e.g., encompassing a plurality of locations) that is associated with certain classification data and/or other descriptive data that assists in classifying future trips with origin locations or destination locations that fall within the hot spot. For example, clustering techniques may be used to identify static or dynamic regions that are frequently associated with particular types of ground truth labels (e.g., classification or descriptive data). As such, techniques described herein allow for the identification of locations that are related to one another, such as various parking lots that are associated with the same establishment (e.g., an office building with multiple nearby parking garages commonly used in association with the office building) as falling within a single hot spot. Ground truth labels may be used to associate hot spots with particular classification or descriptive data. For example, clustering algorithms may identify a plurality of locations included in historical trip records that are close to one another and are associated with ground truth labels that indicate the locations are related to business. As such, a hot spot may be defined that includes a region encompassing the locations, and the hot spot may be associated with a business classification in the predictive model.

The predictive model may be used at run-time (e.g., after the predictive model has been trained, when the application is being executed by a user) to predict a classification of a trip based on a user's trip record received from a client device. For example, a trip record may be received that includes an origin location and timestamp and a destination location and timestamp. The trip record may also include user data, such as an identifier of the user to which the trip record relates. The trip record may be provided as input to the predictive model, which may predict a classification of the trip (e.g., based on correlations or similarities between the trip record and historical trip records), such as by identifying hot spots related to the trip record. If an origin location and/or destination location of the trip record falls within one or more hot spots that are associated with particular classification data or descriptive data in the predictive model, a classification of the trip may be predicted based, at least in part, on these hot spots. In some embodiments, the predictive model may rank the most likely classifications for the trip based on degrees of correlation.

The predictive model may furthermore make use of users' personal data (e.g., data from user profiles, such as a user's age, gender, occupation, industry, income, spending habits, address, education level, and the like) to enhance predictions. For example, hot spots may be identified based on clustering of historical trip records associated with users that work in particular professions or who share other personal characteristics. For example, users with profiles indicating that they work as ride-share drivers may commonly provide ground truth labels indicating that trip records including a particular location are business-related. As such, the predictive model may use the personal user data of a user from which a trip record is received at run-time to improve trip classification. For example, if the user's profile indicates that the user is a ride-share driver, the predictive model may be more likely to correlate the user's trip record with trip records from other ride-share drivers.

After the predictive model has been used to predict a classification of a trip, the classification may be provided to the user. In some embodiments, the user may be enabled to provide feedback regarding the predicted classification, such as by providing input through a user interface on the client device. For example, the user may confirm whether or not the classification is accurate, and may provide additional information about the trip, such as a description of the origin and destination locations and/or a more accurate classification. The user's feedback may be used to re-train the predictive model so that future predictions will be more accurate.

Techniques described herein constitute an improvement with respect to conventional industry practices, as they allow for more accurate classification of trip records based on location data. Using a predictive model that leverages historical trip records and associated ground truth labels, as well as personal user data, to more accurately predict classifications of trips allows applications to provide more effective services that are based on location data. For example, embodiments of the present disclosure may allow for more accurate classification of trips as being business or personal, thereby improving financial services applications such as tax preparation and accounting applications. Furthermore, techniques described herein allow for a user's trips to be automatically classified even when the user does not have any previous trip records, such as when a new user begins using an application. The use of historical trip records gathered from a plurality of users, particularly in combination with personal user data such as occupation data, allows for new users to be provided with accurate predictions of trip classifications.

Example Embodiment

FIG. 1 depicts an example 100 of location data being captured for use in a trip classification techniques described herein. Example 100 is representative of an environment, such as a city block, where users of one or more location-enabled applications travel between different locations. Example 100 includes establishments 151-156, which may comprise buildings or other destinations (e.g., businesses, landmarks, parks, and the like). Example 100 further includes users 120, 122, 124, and 130, each of which is depicted in a vehicle. Users 120, 122, and 124 are users from whom historical trip records are received and used to train a predictive model, while user 130 is a user for whom the predictive model is used to classify a trip based on a trip record received from user 130 at run-time.

Historical trip records may be received from users 120, 122, and 124, all of which include locations (e.g., origin and/or destination locations) that are close to one another but not identical. For example, historical trip records from users 120, 122, and 124 may include latitude and longitude measurements (e.g., that may include many digits, which usually refer to minutes, seconds, etc. of resolution) for origin and destination locations that were detected using satellite-based positioning systems (e.g., GPS), as well as associated time stamps. As can be seen in example 100, users 120 and 122 were located in separate parking lots near establishment 156, while user 124 was parked in a different location near establishment 156. Users 120, 122, and 156 may have each provided a ground truth label identifying their trip record as having a business classification. Clustering algorithms may be used to determine a hot spot 190 encompassing the destination locations from these trip records of users 120, 122, and 124, and the hot spot may be associated with a business classification as part of training the predictive model. Hot spots (e.g., hot spot 190) may, for example, be centered based on an average of the locations encompassed by the hot spot or based on the location of an establishment associated with the locations.

In one embodiment, establishment 156 comprises an airport, and each of users 120, 122, and 124 has a user profile (e.g., associated with an application) indicating that the user's occupation is "ride-share driver". Ground truth labels provided by users 120, 122, and 124 may further indicate that establishment 156 is an airport. For example, when user 120 completed the trip, user 120 may have been prompted via a user interface of the user's client device to classify the trip or provide other descriptive data about the trip. User 120 may have classified the trip as "business", and may have added labels for the origin and/or destination locations (e.g., "airport"). The trip records received from users 120, 122, and 124 may include ground truth labels, and the ground truth labels may be used when training the predictive model. Clustering algorithms may be used to identify that these locations of users 120, 122, and 124 are all related to the same establishment 156 (the airport), and that the region encompassing these locations is a hot spot 190 in particular for ride-share drivers. These associations may be identified and maintained in the predictive model as part of the training process.

At run-time, a trip record may be received from user 130 including an origin location 132 and a destination location 134 (e.g., captured using a satellite positioning system associated with a client device operated by user 130). The trip record may be provided as input to the model in order to predict a classification of the trip that is represented by the trip record. The predictive model may identify that the destination location 134 falls within hot spot 190 that is associated with a business classification (e.g., in particular for ride-share drivers). Furthermore, user 130 may have a profile that includes occupation information indicating that user 130 is a ride-share driver. As such, the predictive model's prediction may further be based on the occupation information of user 130. For example, the occupation information of user 130 may be determined to be similar to (e.g., correlated with) the occupation information of users 120, and 122, and 124, and this similarity may strengthen the weight of a prediction that the trip is for business (e.g., rather than a personal trip to the airport). If, for example, destination location 134 also fell within a region defined within the predictive model as a different hot spot (not shown) associated with a classification of "personal" (e.g., if establishment 152 is an apartment building and some users park on the street nearby the apartment building but also near the airport), the correlation of user 130 with users 120, 122, and 124 based on occupation may cause the trip to correctly be classified as business rather than personal.

While hot spot 190 is shown as a circular region in FIG. 1, hot spots may comprise dynamically sized and shaped regions that are updated over time as the predictive model is continuously trained based on new trip records. For example, the radius of hot spot 190 may adapt over time based on additional trip records. Locations may be grouped together into hot spots (e.g., using image analysis of heat maps of visited locations or clustering algorithms such as geohashing, DBSCAN, k-means, hierarchical clustering, and the like) based on any number of characteristics, such as whether locations are origin or destination locations in trip records, time stamps associated with trip records, personal user data associated with trip records, ground truth labels associated with trip records, numbers of users visiting locations within a particular region, number of visits to locations, ratios of business to personal trips involving certain locations, and the like. Clustering algorithms may be used to resolve a variety of detected positions that are essentially associated with the same location into a hot spot, even though they are represented by slightly different coordinates (e.g., different parking areas associated with the same apartment building).

Location coordinates (e.g., latitude and longitude) may be decomposed into features (e.g., the locations may be "featurized") by reducing a precision (e.g., truncating digits after two decimal places) of the coordinates of the locations (e.g., that were captured using GPS). Clustering and featurization may be used, based on ground truth labels, to group locations into hot spots that are associated with certain features (e.g., regions, personal user data, time stamps, and the like) in the predictive model.

In some embodiments, the predictive model may determine scores (e.g., confidence scores) for different potential predictions (e.g., business and personal) based on an amount of similarity between the trip record (e.g., along with personal user data of the user) and features associated with hot spots. For example, if a trip record includes an origin or destination location that falls within a plurality of hot spots that are each associated with different classification information, the predictive model may assign a score to each potential classification based on an amount of similarity (e.g., based on personal user data, proximity, amount of historical trip records related to the hot spot, historical trip records of the user, and the like). The predictive model may choose the potential classification with the highest confidence score as the predicted classification for the trip. In some embodiments, a confidence score for a prediction must exceed a certain threshold for the prediction to be chosen.

In some embodiments, time stamps that identify dates and times associated with origin and destination locations in trip records may further be used as input features for the predictive model. For example, in historical trip records, users may frequently classify trips to a particular downtown block as business on weekdays, but may more commonly classify trips to the same downtown block as personal on weekends. As such, the time stamps associated with trip records received at run-time may be used by the predictive model to improve the accuracy of predictions based on the trip records. For example, if a trip record including a destination location of the downtown block has a time stamp indicating that the trip record was captured during the morning on a weekday, this time stamp may increase the score of a prediction that the trip should be classified as business rather than personal based on correlations with the historical trip records.

While certain embodiments are described as involving historical trip records of a plurality of users, techniques described herein may also be employed based only on historical trip records of a particular user. For example, after a user has completed a plurality of trips and provided ground truth labels related to the trip records for these trips, the predictive model may be trained based on the user's historical trip records to make predictions about future trips by the user according to techniques described herein.

Furthermore, while embodiments include predicting classifications of trips based on trip records, the predictive model described herein may also be used to make other predictions related to a user's activity. For example, the predictive model may be used to predict whether a particular location is a user's home address, place of business, or the like based on similarities identified between the location (e.g., in view of personal user data of the user) and historical descriptive data associated with hot spots in the predictive model. As another example, the predictive model may be used to predict a user's destination location based on a variety of data points, such as the user's origin location, the time of day, personal user data, and the like. For example, if a user begins a trip at a residential location (e.g., the user's home) in the morning on a weekday, the predictive model may predict that the user's destination location will be the user's place of business based on correlations with historical trip records of the user (and/or other users with similar characteristics). As such, the user may be proactively provided with information related to the predicted destination location, such as directions, ideal routes, a prompt to confirm that the trip is related to business, a proposed rule (e.g., "always classify trips from here as business?"), and/or the like.

Each time the predictive model makes a prediction based on a trip record, the prediction may be provided to the user associated with the trip record, and the user may be given an opportunity to provide feedback regarding the prediction. If the user confirms that the prediction is accurate, the trip record may be used along with the user feedback (e.g., ground truth label) to re-train the predictive model. In some cases, re-training the model may include adjusting the sizes and/or shapes of hot spots, as well as changing information associated with hot spots, based on the user feedback about the prediction. As such, the sizes and shapes of hot spots may be dynamic, and the predictive model may continuously improve over time. Techniques described herein may involve the use of semi-supervised training methods for training the predictive model (e.g., involving an automated process that is partially supervised by user-provided data, such as ground truth labels).

Example Computer-Implemented Method

Figure 2:
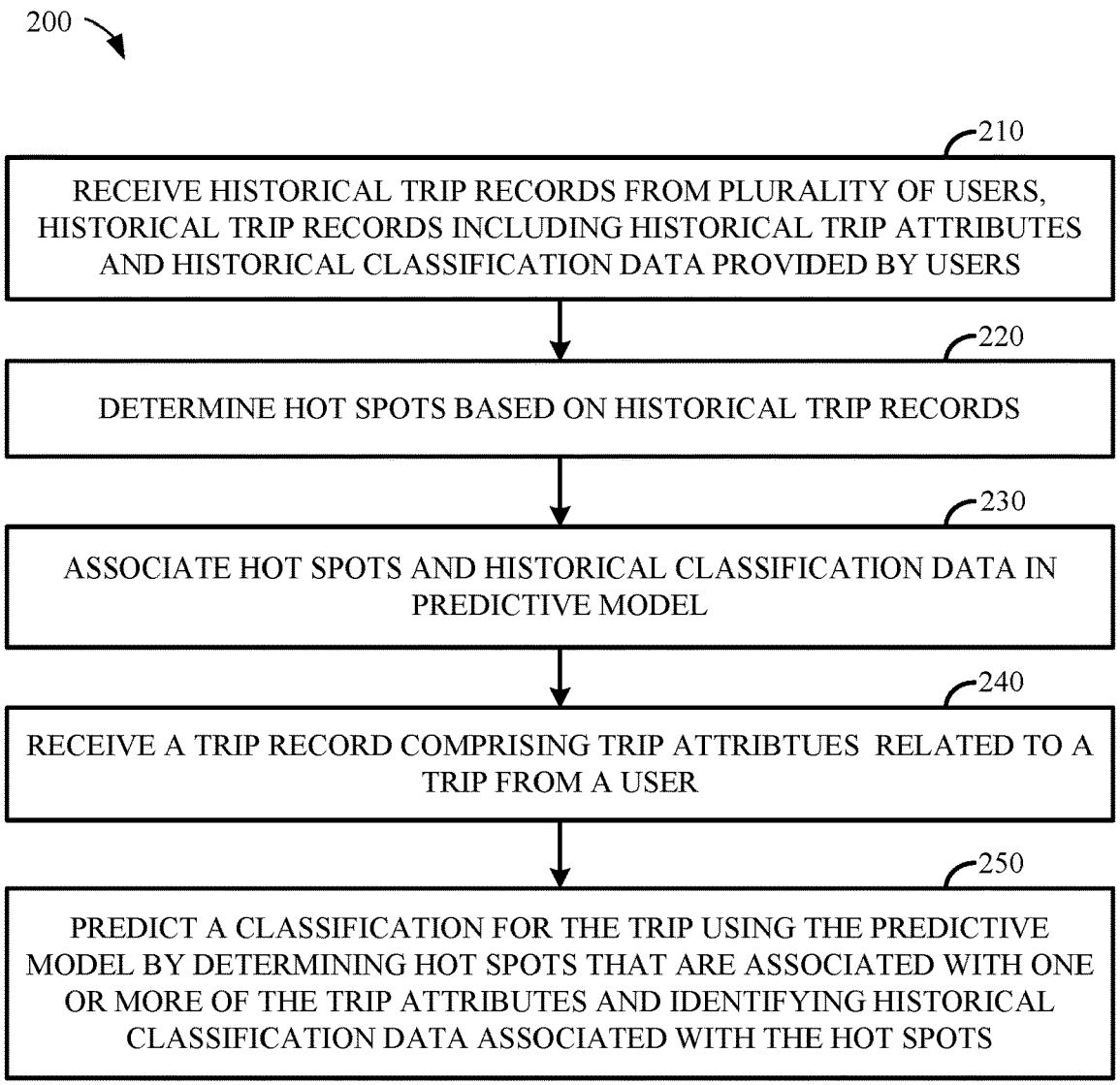
FIG. 2 depicts example operations for classifying a trip.

FIG. 2 depicts example operations 200 for classifying a trip. Operations 200 may, for example, be performed by a server that comprises a server-side portion of a client-server application (e.g., a financial services application).

Operations 200 begin at step 210, where historical trip records are received from a plurality of users, the historical trip records including historical trip attributes (e.g., origin and destination locations with associated timestamps, user identifiers of the users associated with the trips, and the like), and historical classification data provided by the plurality of users (e.g., ground truth labels). Historical trip records may have been captured by a plurality of client devices (e.g., using satellite positioning systems) associated with the plurality of users and provided to the server.

At step 220, hot spots are determined based on the historical trip records as part of a training process for a predictive model. For example, clustering algorithms may be used to identify regions that share a plurality of common features based on the historical trip attributes and personal user data of the users associated with the historical trip records. Personal user data may, for example, be retrieved from a local or remote data store associated with the server that stores information related to the application (e.g., user profiles, application content, application state data, and the like), and may be retrieved based on user identifiers associated with the historical trip records. In one embodiment, hot spots are determined that encompass a plurality of locations (e.g., origin and/or destination locations) included in the historical trip records. Hot spots may be associated with particular personal user data (e.g., occupation, spending habits, and the like), and may also be associated with particular time periods (e.g., based on time stamps included in the historical trip records).

At step 230, hot spots are associated with historical classification data in the predictive model. For example, hot spots may be identified and maintained in the predictive model in association with information derived from ground truth labels (e.g., including classification data provided by users) that are correlated with the hot spots.

At step 240, a trip record comprising trip attributes related to a trip is received from a user. For example, at run-time the server may receive a trip record captured by a client device operated by the user. Trip attributes included in the trip record may comprise an origin location with an associated time stamp as well as a destination location with an associated timestamp. The trip record may further include a user identifier of the user.

At step 250, the classified classification for the trip is predicted by using the predictive model to determine hot spots related to one or more of the trip attributes and identify historical classification data that is associated with the hot spots. For example, the predictive model may determine that the origin and/or destination location falls within one or more hot spots. The one or more hot spots may be associated in the predictive model with historical classification data (e.g., based on ground truth labels associated with historical trip records), and the predictive model may assign confidence scores to different potential classifications (e.g., business or personal) based on an amount of similarity between the trip record (e.g., in view of personal user data of the user) and features associated with the one or more hot spots. The user identifier may be used to retrieve personal user data associated with the user, and the personal user data may be used in identifying relevant hot spots and associated classification information. For example, if the user is a taxi driver, the predictive model may assign higher confidence scores to potential classifications that are based on correlations with hot spots associated with historical trip records of other taxi drivers. If a potential classification has a confidence score above a particular threshold (e.g., that is determined in advance by a system administrator or developer), the potential classification may be chosen as the predicted classification of the trip. In some embodiments, the potential classification with the highest confidence score is chosen as the predicted classification of the trip.

The classification predicted by operations 200 may be provided to the user, and the user may provide feedback that is used to re-train the model. For example, if the user confirms that the predicted classification is accurate, the accurate prediction will be stored in the model to improve future predictions.

Example Trip Records

FIG. 3A depicts an example trip record 300A. For example, trip record 300A may comprise a trip record that is received from a user at run-time, and may be used to predict a classification of a trip described by trip record 300A.

Trip record 300A includes an origin location and a destination location, each of which is described by a latitude, a longitude, and a time stamp. For example, the latitude and longitude coordinates may be Global Positioning System (GPS) coordinates, or another similar satellite-based positioning system (e.g., GLONASS). Trip record 300A further includes a user identifier that identifies the user (e.g., "RuntimeUser1") with which trip record 300A is associated. Latitude and longitude values may be captured using a satellite positioning system associated with a client device operated by the user, and the time stamps may be captured from a clock associated with the client device. The user identifier may be a username or other identifier that is used to identify the user within an application, such as to store and retrieve personal user data.

FIG. 3B depicts an example historical trip record 300B. For example, historical trip record 300B may comprise a historical trip record from a user that is used in the process of training a predictive model.

Trip record 300B includes an origin location and a destination location, each of which is described by a latitude, a longitude, and a time stamp. Trip record 300B further includes a user identifier that identifies the user (e.g., "HistoricalUser123") with which trip record 300B is associated. Latitude and longitude values may be captured using a satellite positioning system associated with a client device operated by the user, and the time stamps may be captured from a clock associated with the client device. The user identifier may be a username or other identifier that is used to identify the user within an application, such as to store and retrieve personal user data. Trip record 300B further includes a ground truth label, which in this case indicates that the trip is classified as a business trip. For example, HistoricalUser123 may have provided the ground truth label through a user interface prior to or upon completing the trip described by trip record 300B.

Example Networking Environment

Figure 4:
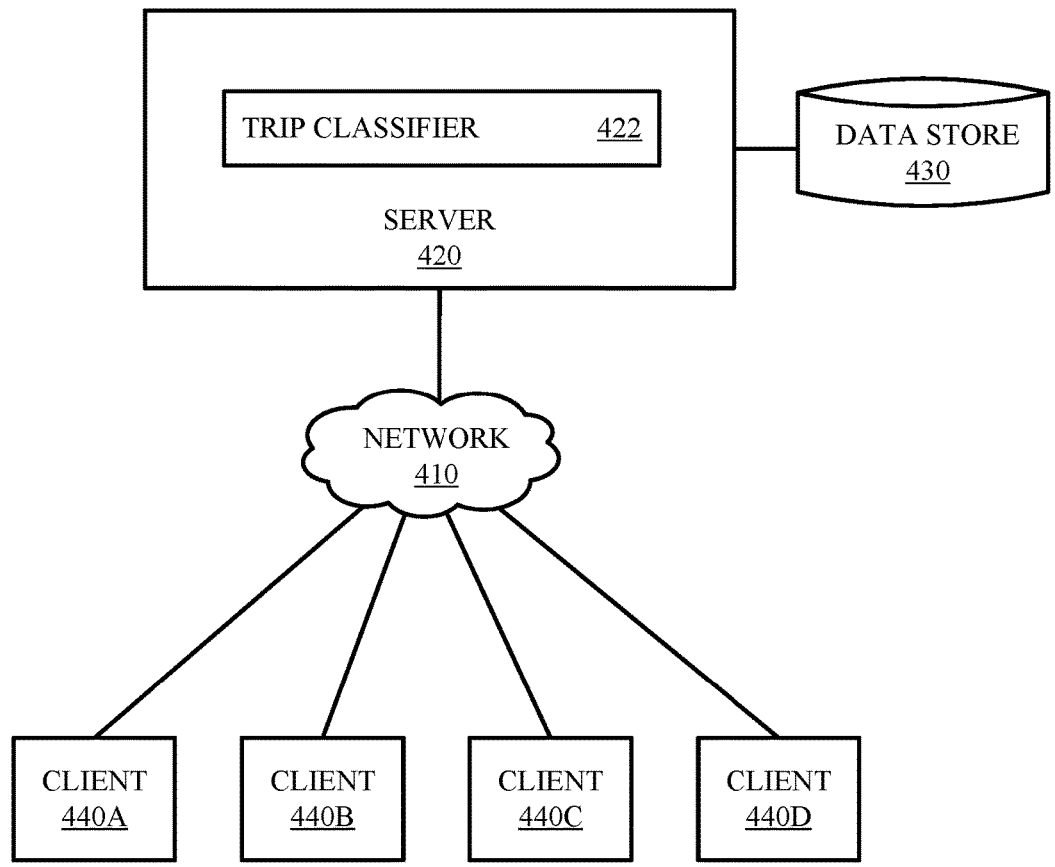
FIG. 4 depicts an example networking environment in which embodiments of the present disclosure may be implemented.

FIG. 4 depicts an example networking environment 400 in which embodiments of the present disclosure may be implemented.

Networking environment 400 comprises a server 420 with an associated data store 430 and a plurality of clients 440A-D, all of which are connected over a network 410, such as the Internet.

Server 420 may comprise a physical or virtual computing device, such as a server, desktop computer, laptop computer, virtual machine, or the like. Server 420 comprises a trip classifier 422, which may perform operations described herein related to using a predictive model to classify trips.

Data store 430 may comprise a data storage entity, such as a repository, database, virtual storage device, or the like. In some embodiments, data store 430 stores personal user data of users that operate clients 440A-D. While data store 430 is shown separately from server 420, it is noted that data store 430 may alternatively be part of server 120.

Clients 140A-D may comprise computing devices, such as mobile devices, laptop computers, tablets, or the like, and may be used to capture trip records for users. Each of clients 140A-D may be equipped with a location tracking system, such as a satellite positioning system.

Trip classifier 422 on server 420 may receive historical trip records from a variety of users, such as the users of clients 440A-C. Trip classifier 422 may train a predictive model based on the historical trip records (e.g., in conjunction with personal user data of the users retrieved from data store 430 based on user identifiers included in the historical trip records), which may involve determining hot spots. At run-time, trip classifier 422 may receive a trip record from a user, such as the user of client 440D. Trip classifier 422 may use the predictive model to predict a classification (or other information, such as descriptions of locations) of the trip described by the trip record, which may involve determining hot spots associated with the trip record. In some embodiments, trip classifier 422 also retrieves personal user data of the user from data store 430, and may use the personal user data of the user in the predictive process (e.g., to identify correlations using the predictive model as described herein).

Server 420 may provide a predicted classification to the user, such as the user of client 440D, over network 410. The predicted classification may be provided to the user via a user interface of client 440D, and the user may provide feedback related to the predicted classification. The user's feedback may be provided by client 440D to server 420, and trip classifier 422 may use the feedback to re-train the predictive model.

While certain functions are described with respect to particular components depicted in FIG. 4, it is noted that other arrangements are possible. Furthermore, certain components may alternatively be implemented as a plurality of local or remote components. For example, the functionality of server 420 may be distributed across a plurality of computing devices.

Figure 5:
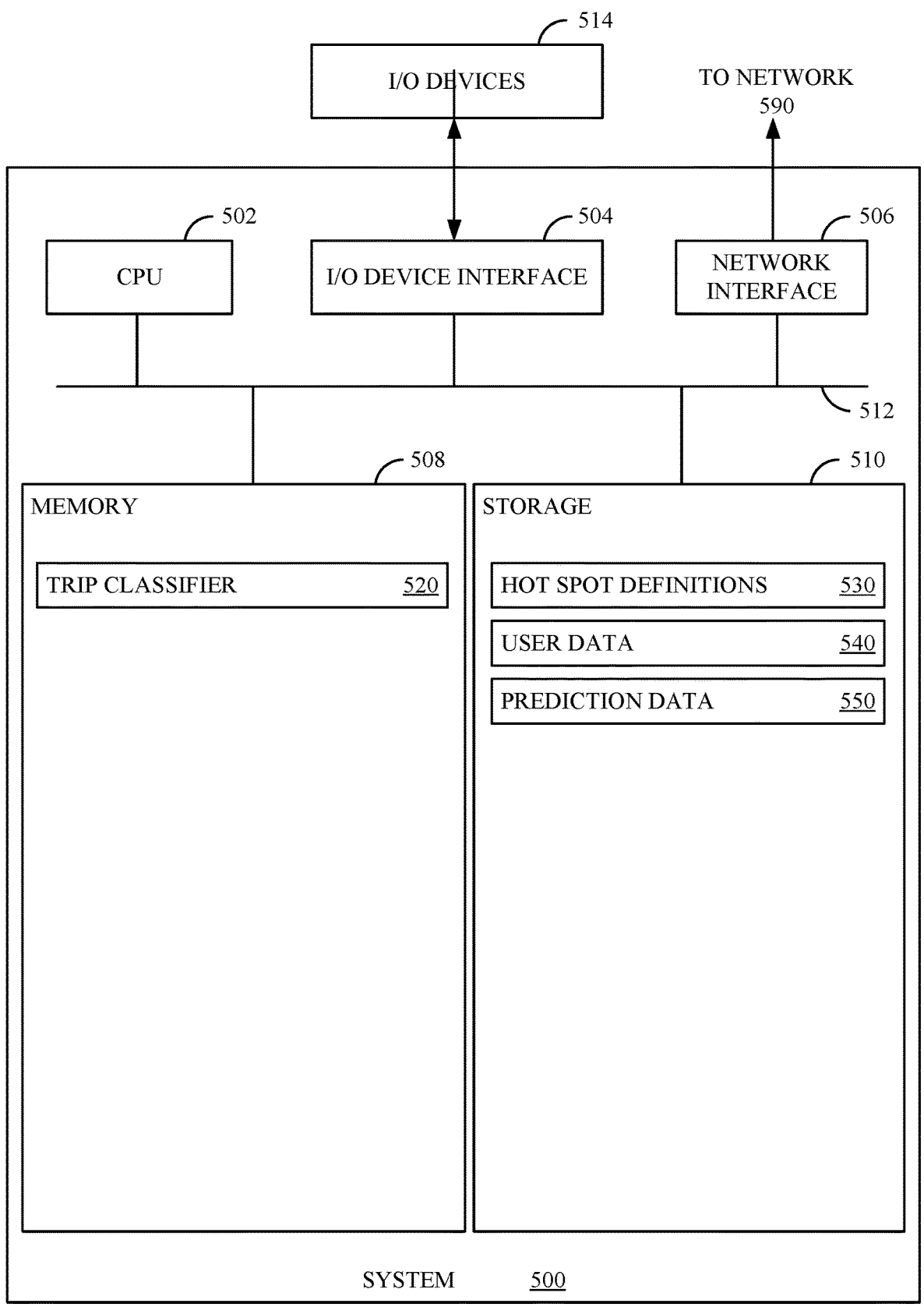
FIG. 5 depicts an example computing system with which embodiments of the present disclosure may be implemented.

FIG. 5 illustrates an example system 500 used for classifying a trip, according to embodiments of the present disclosure. For example, system 500 may be representative of server 420 in FIG. 4.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises hot spot definitions 530, which may comprise data describing hot spots (e.g., region definitions) and associated features, such as trip attributes, personal user data, classification information, descriptive information, and the like. Storage 510 further comprises user data 540, which may comprise personal user data (e.g., user profiles) associated with users of an application (e.g., a financial services application).

As shown, memory 508 includes a trip classifier 520, which may perform operations related to classifying a trip (e.g., functionality described above with respect to FIGS. 1-4). For example, trip classifier 520 may receive historical trip records, and may train a predictive model based on the historical trip records (e.g., including user data 540 of users associated with the historical trip records). Training the predictive model may include determining hot spot definitions 530, as described herein. Furthermore, trip classifier 520 may receive a trip record from a user at run-time, and may provide the trip record as input to the predictive model in order to classify the trip described by the trip record (e.g., as business or personal) based on an output of the predictive model. Trip classifier 520 may access user data 540 in order to retrieve personal user data of the user to provide along with the trip record to the predictive model. Trip classifier 520 in memory 508 may communicate with other devices (e.g., clients and remote data stores) over a network 590 through network interface 506 (e.g., in order to receive trip records, retrieve personal user data, provide predictive information, receive user feedback, and the like).

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A developer interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for trip classification, comprising:
   receiving, from a plurality of users, a plurality of classified trip records, wherein each classified trip record of the plurality of classified trip records comprises:
      one or more trip attributes comprising an attribute associated with a respective user of the plurality of users; and
      classification information;
   determining a hot spot based on the plurality of classified trip records received from the plurality of users, wherein the hot spot comprises a region that encompasses one or more locations; and
   storing an association between the hot spot, a corresponding attribute related to one or more respective users of the plurality of users, and corresponding classification information;
   receiving a trip record comprising a location related to a trip and a given attribute associated with a user related to the trip; and
   predicting a classification of business or personal for the trip based on:
      the location related to the trip;
      the given attribute associated with the user related to the trip; and
      the association between the hot spot, the corresponding attribute related to the one or more respective users of the plurality of users-, and the corresponding classification information.

2. The method of claim 1, wherein each classified trip record of the classified trip records comprises one or more of:
   an origin location; or
   a destination location.

3. The method of claim 1, wherein the hot spot comprises a dynamic region.

4. The method of claim 1, wherein the location related to the trip comprises:
   an origin location; or
   a destination location.

5. The method of claim 1, wherein predicting the classification for the trip comprises determining that the location related to the trip falls within the hot spot.

6. The method of claim 1, further comprising providing the classification to a user.

7. The method of claim 6, further comprising:
receiving feedback from the user about the classification; and
predicting one or more classifications of subsequent trip records based in part on the feedback.

8. The method of claim 1, wherein predicting the classification for the trip is based on:
one or more classified trip records of a user associated with the trip record; and
one or more additional classified trip records of one or more users other than the user.

9. The method of claim 1, wherein the given attribute associated with the user related to the trip comprises one or more of:
an occupation of the user related to the trip;
an industry of the user related to the trip;
an income of the user related to the trip;
a spending habit of the user related to the trip;
an address of the user related to the trip; or
an education of the user related to the trip.

10. A system for trip classification, the system comprising:
one or more processors; and
memory comprising instructions that, when executed by the one or more processors, cause the system to:
receive, from a plurality of users, a plurality of classified trip records, wherein each classified trip record of the plurality of classified trip records comprises:
one or more trip attributes comprising an attribute associated with a respective user of the plurality of users; and
classification information;
determine a hot spot based on the plurality of classified trip records received from the plurality of users, wherein the hot spot comprises a region that encompasses one or more locations; and
store an association between the hot spot, a corresponding attribute related to one or more respective users of the plurality of users, and corresponding classification information;
receive a trip record comprising a location related to a trip and a given attribute associated with a user related to the trip; and
predict a classification of business or personal for the trip based on:
the location related to the trip;
the given attribute associated with the user related to the trip; and
the association between the hot spot, the corresponding attribute related to the one or more respective users of the plurality of users, and the corresponding classification information.

11. The system of claim 10, wherein each classified trip record of the classified trip records comprises one or more of:
an origin location; or
a destination location.

12. The system of claim 10, wherein the hot spot comprises a dynamic region.

13. The system of claim 10, wherein the location related to the trip comprises:
an origin location; or
a destination location.

14. The system of claim 10, wherein predicting the classification for the trip comprises determining that the location related to the trip falls within the hot spot.

15. The system of claim 10, wherein the instructions, when executed by the one or more processors, further cause the system to provide the classification to a user.

16. The system of claim 15, wherein the instructions, when executed by the one or more processors, further cause the system to:
receive feedback from the user about the classification; and
predict one or more classifications of subsequent trip records based in part on the feedback.

17. The system of claim 10, wherein predicting the classification for the trip is based on:
one or more classified trip records of a user associated with the trip record; and
one or more additional classified trip records of one or more users other than the user.

18. The system of claim 10, wherein the given attribute associated with the user related to the trip comprises one or more of:
an occupation of the user related to the trip;
an industry of the user related to the trip;
an income of the user related to the trip;
a spending habit of the user related to the trip;
an address of the user related to the trip; or
an education of the user related to the trip.

19. A non-transitory computer-readable medium comprising instructions that, when executed by one or more processors of a computing system, cause the computing system to:
receive, from a plurality of users, a plurality of classified trip records, wherein each classified trip record of the plurality of classified trip records comprises:
one or more trip attributes comprising an attribute associated with a respective user of the plurality of users; and
classification information;
determine a hot spot based on the plurality of classified trip records received from the plurality of users, wherein the hot spot comprises a region that encompasses one or more locations; and
store an association between the hot spot, a corresponding attribute related to one or more respective users of the plurality of users, and corresponding classification information;
receive a trip record comprising a location related to a trip and a given attribute associated with a user related to the trip; and
predict a classification of business or personal for the trip based on:
the location related to the trip;
the given attribute associated with the user related to the trip; and
the association between the hot spot, the corresponding attribute related to the one or more respective users of the plurality of users-, and the corresponding classification information.

20. The non-transitory computer-readable medium of claim 19, wherein each classified trip record of the classified trip records comprises one or more of:
an origin location; or
a destination location.

* * * * *